United States Patent
Yang et al.

(10) Patent No.: US 6,771,815 B2
(45) Date of Patent: *Aug. 3, 2004

(54) IMAGE CORRECTION APPARATUS AND RECORDING MEDIUM FOR STORING IMAGE CORRECTION PROGRAM

(75) Inventors: Juping Yang, Kawasaki (JP); Yukio Nakagawa, Yokohama (JP)

(73) Assignee: Nikon Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/505,691

(22) Filed: Feb. 18, 2000

(65) Prior Publication Data

US 2003/0202714 A1 Oct. 30, 2003

(30) Foreign Application Priority Data

Feb. 19, 1999 (JP) ............................................. 11-040813

(51) Int. Cl.⁷ ............................ G06K 9/36; H04N 1/407; G03N 3/08
(52) U.S. Cl. ...................... 382/169; 382/274; 358/3.01; 358/521; 358/522
(58) Field of Search ................................. 382/169, 270, 382/274, 172; 358/1.9, 3.01, 521, 522

(56) References Cited

U.S. PATENT DOCUMENTS

| 5,249,241 | A | * | 9/1993 | Silverman et al. ........... 382/169 |
| 5,502,776 | A | * | 3/1996 | Manabe ....................... 382/172 |
| 5,751,846 | A | * | 5/1998 | Higgins-Luthman et al. ............ 382/169 |
| 5,757,022 | A | * | 5/1998 | Kobayashi et al. ......... 250/583 |
| 5,848,182 | A | * | 12/1998 | Kanamori .................... 382/171 |
| 5,850,298 | A | * | 12/1998 | Narahara et al. ........... 358/518 |
| 6,055,331 | A | * | 4/2000 | Nakamura ................... 382/168 |
| 6,259,472 | B1 | * | 7/2001 | Park ............................ 348/28 |
| 6,463,173 | B1 | * | 10/2002 | Tretter ........................ 382/168 |

OTHER PUBLICATIONS

Gonzalez et al, Digital Image Processing, 1992, Addison-Wesley Publishing Company, p 178–179.*

* cited by examiner

Primary Examiner—Bhavesh M. Mehta
Assistant Examiner—Christopher Sukhaphadhana
(74) Attorney, Agent, or Firm—Oliff & Berridge, PLC (57) ABSTRACT

A histogram is prepared by calculating the pixel number ratio corresponding to each gradation in relation to the total number of pixels in image data obtained from the outside. A threshold value for the pixel number ratio corresponding to a given gradation that is determined through user specification is compared against the pixel number ratio corresponding to each gradation in the histogram. Based upon the results of the comparison, the histogram gradation width is corrected. For instance, the width representing the range of gradations with pixel number ratios smaller than the threshold value in the histogram is compressed. Then, the gradation width in the histogram is expanded to achieve the number of pre-compression gradations.

6 Claims, 8 Drawing Sheets

IMAGE CORRECTION APPARATUS AND RECORDING MEDIUM FOR STORING IMAGE CORRECTION PROGRAM

INCORPORATION BY REFERENCE

The disclosure of the following priority application is incorporated herein by reference:
Japanese Patent Application No. 11-40813 filed Feb. 19, 1999.

BACKGROUND OF THE INVENTION

1. Field of the Invention

The present invention relates to an image correction apparatus that corrects the gradation characteristics of an image and in particular, an image correction apparatus that performs a correction on an image whose quality has deteriorated due to poor illumination conditions, exposure conditions or the like during an image-capturing operation performed in an electronic camera that employs a solid image-capturing element or a camera that employs silver halide film. It also relates to a recording medium that stores an image correction program and can be read by a computer.

2. Description of the Related Art

Generally, an image captured by a camera, whether it is a monochrome image or a color image, is evaluated based upon the gradation (lightness) of the individual pixels. Monochrome gradation is used for a monochrome image and gradations of R (red), G (green) and B (blue), or C (cyan), M (magenta) and Y (yellow) or the like are used for a color image. Since image quality deteriorate due to certain photographing conditions, fading or the like, various methods are employed to perform image correction.

Gradation correction is an effective method of image correction, and gradation correction in the prior art is achieved by using a histogram that indicates gradient frequency distribution. Such a histogram is calculated as follows. The gradations of individual pixels constituting an image are detected, and the number of pixels (frequency) at each gradation of, for instance, 256 gradations, is calculated. A histogram is achieved by plotting the number of pixels (frequency) corresponding to each gradation.

In this image correction, the gradation distribution of an image is corrected by excluding ranges from the upper end (the maximum gradations) and the lower end (the minimum gradations) of the histogram to an extent corresponding to the numbers of pixels specified by the user as threshold values and then converting the histogram through the conversion formula in formula 1 in the prior art.

$$C(x)=n(x-a)/(b-a) \qquad \text{formula 1}$$

In the formula above, x represents the gradations before correction, a represents the minimum value of the gradations before the correction, b represents the maximum value of the gradations before the correction, C(x) represents the gradations after the correction and n is the difference between the maximum gradation and the minimum gradation of the corrected image which is normally the maximum value, i.e., 255, of 8-bit data.

It can be clearly understood that the width of the gradation range in the poor image is expanded to 8 bits (256 gradations) through the correction achieved by using conversion formula 1.

Figure 4:
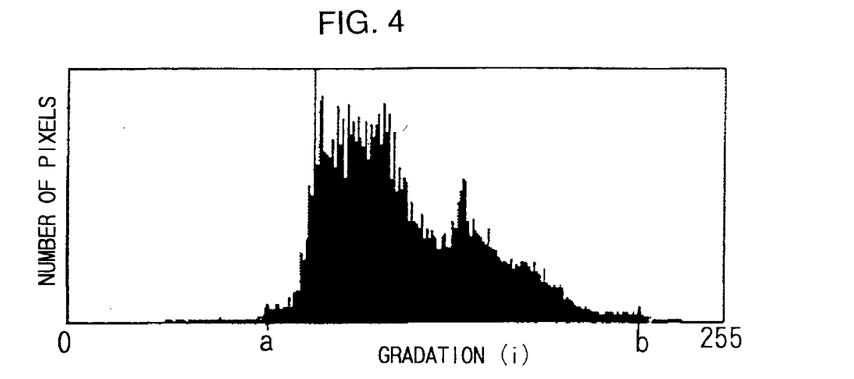
FIG. 4 is an example of a histogram of an image.
Figure 5:
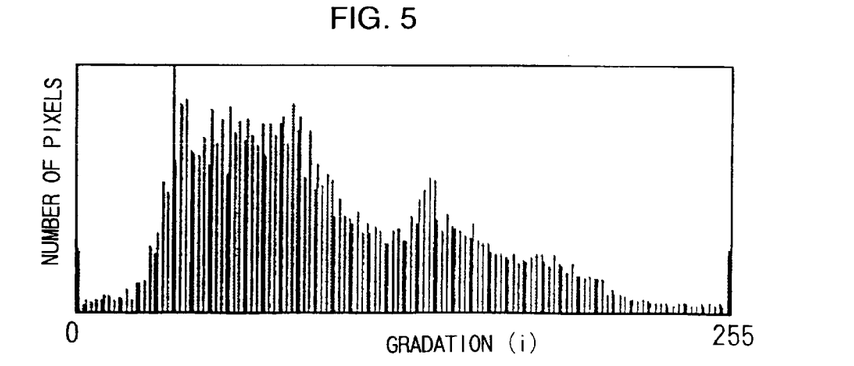
FIG. 5 shows a histogram made by correcting the histogram in FIG. 4 through the method in the prior art.

Through this technology in the prior art, an image with poor contrast corresponding to the histogram in FIG. 4 is corrected in a satisfactory manner by correcting the histogram to achieve the histogram in FIG. 5. In other words, the technology in the prior art is effective as long as the histogram does not manifest a major constriction of gradation values.

Figure 6:
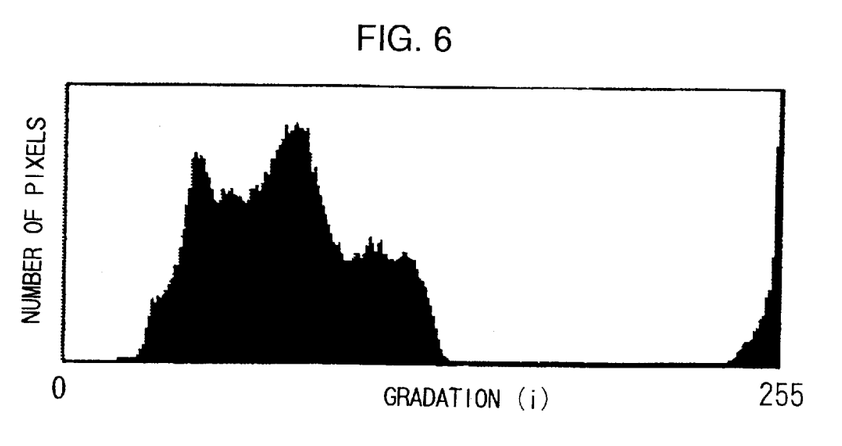
FIG. 6 presents an example of a histogram that cannot be adequately corrected through the method in the prior art.

However, an image photographed under certain illumination conditions and exposure conditions may not always be corrected in a satisfactory manner through the image correction method in the prior art. For instance, when photographing a person in strongly backlit conditions, a phenomenon whereby the image of the person is blacked out with the background being washed out often manifests. The histogram of such an image may be as shown in FIG. 6. FIG. 6 indicates that the number of pixels in the middle gradations is extremely low compared to that in the low gradations and the high gradations. Since the gradation width of this image is already close to 256, it is safe to conclude that the image cannot be adequately corrected by using formula 1 as in the prior art. Hardly any improvement is made with respect to the problem of image with undesirable black area or dark area due to underexposed image of the person and with undesirable white area or bright area due to the overexposed image of the background.

Figure 7:
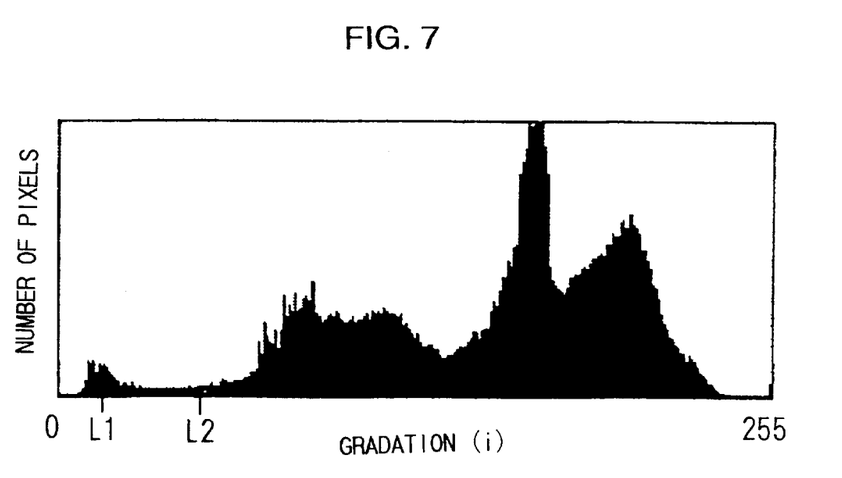
FIG. 7 presents another example of a histogram that cannot be adequately corrected through the method in the prior art.

In addition, it is difficult to achieve an adequate correction when a wide gradation range with small numbers of pixels extends toward the lower end (generally, toward both the upper and lower ends) of the histogram, as illustrated in FIG. 7 as well. Namely, in the method in which the ranges extending from the upper end (the maximum gradation) and the lower end (the minimum gradation) of the histogram to points in the histogram specified by the user as threshold values (expressed as numbers of pixels) are excluded, an adequate image correction effect is not realized if the ratio of the numbers of pixels set for exclusion is low, e.g., if the ratio corresponding to the gradation at (L1) in FIG. 7 is set. In addition, if the ratio number of pixels set for exclusion is high, e.g., if the ratio corresponding to the gradation at (L2) in FIG. 7 is set, a problem arises in that a large portion of the gradation information in the original image is lost. Thus, it may not always be possible to specify correct threshold values when employing the method in the prior art.

SUMMARY OF THE INVENTION

An object of the present invention is to provide an image correction apparatus capable of correcting images that cannot be corrected by using the image correction method in the prior art and a recording medium that stores an image correction program and can be machine read.

In order to resolve the above mentioned problem, in the present invention, a threshold value is specified by the ratio of the number of pixels at one gradation against the total number of pixels and the image is corrected based upon comparison of the threshold value and the ratio at each gradation in the histogram. While in the image correction method in the prior art, a threshold value for cutting off the histogram is specified by the ratio of the accumulated number of pixels in the individual gradations starting from the upper end or the lower end of the histogram.

Accordingly, the object is achieved in the image correction apparatus according to the present invention by comprising an image intake unit that obtains image data from the outside, a histogram preparation unit that prepares a histogram by calculating the ratio of the number of pixels corresponding to each gradation against the total number of pixels based upon the image data and a gradation correction unit that corrects the gradation width of the histogram through comparison of a threshold value for the ratio of the number of pixels corresponding to one gradation determined through user specification and the ratio of the number of pixels corresponding to each gradation in the histogram.

The gradation correction unit is capable of correcting the gradation width of the histogram by compressing the width of gradations whose ratio of number of pixels is less than the threshold value in the histogram. It may compress the gradation width by excluding gradations whose ratio of numbers of pixels is less than the threshold value. The gradation width may be compressed at a compression rate that is in inverse proportion to the ratio of the number of pixels. The width of the gradation whose ratio of number of pixels is less than the threshold value may be compressed to the minimum gradation width, i.e., 1. In other words, if a plurality of gradations with ratios of numbers of pixels that are less than the threshold value are present continuously, the value achieved by integrating these numbers of pixels may be handled as the frequency corresponding to one gradation.

The threshold value may be expressed as a function (S(i)) of the gradation (i). In this case, the ratio of the number of pixels corresponding to each gradation in the histogram is compared against the threshold value S(i). This means that the threshold value (S) is varied in correspondence to the gradation (i) For instance, when correcting an image to be placed emphasis on the middle gradations, the threshold value (S) should be set low in the middle gradations with the threshold value (S) set to a large value in the low gradations and the high gradations.

In addition, the image correction apparatus may further comprise a full gradation expansion unit that expands the gradation width over the entire histogram.

In a recording medium according to the present invention that records the image correction program and can be machine read, a program comprising an image intake procedure in which image data are obtained from the outside, a histogram preparation procedure in which a histogram is prepared by calculating the ratio of the number of pixels corresponding to each gradation against a total number of pixels based upon the image data and a gradation correction procedure in which the gradation width of the histogram is corrected based upon comparison of a threshold value for the ratio of the number of pixels corresponding to a given gradation determined through user specification and the ratio of the number of pixels corresponding to each gradation in the histogram is stored. By setting the recording medium in a computer and loading the program, the computer is enabled to function as the image correction apparatus described earlier.

DESCRIPTION OF THE PREFERRED EMBODIMENTS

Figure 3:
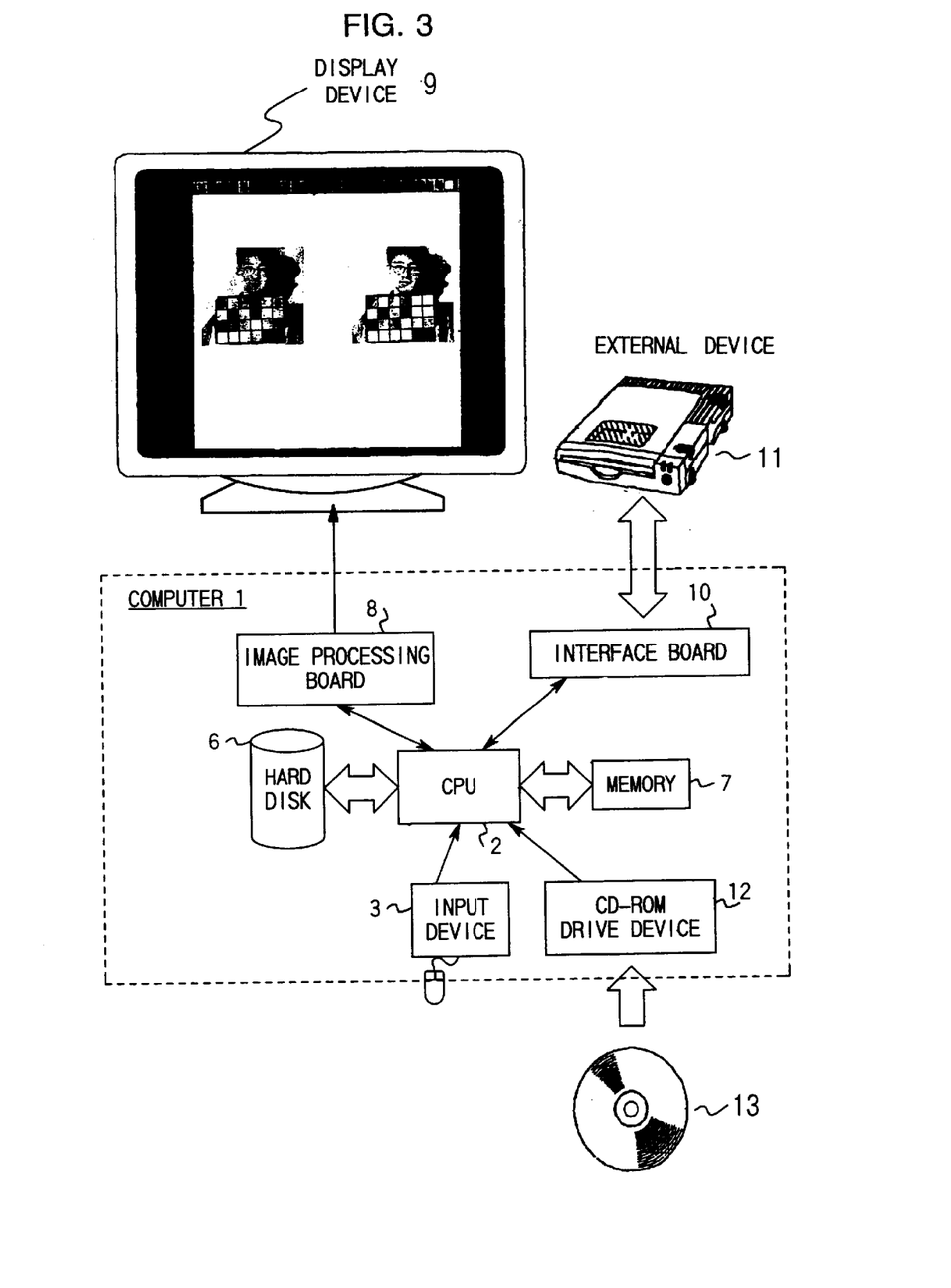
FIG. 3 is a schematic diagram illustrating the hardware configuration according to the present invention.

The overall structure of the image correction apparatus in an embodiment of the present invention achieved by employing a computer is shown in FIG. 3. In FIG. 3, a computer 1 is provided with a CPU (microprocessor) 2. An input device 3 constituted of a keyboard, a mouse or the like, a hard disk 6, a memory 7, an image processing board 8 and an interface board 10 are connected to the CPU 2. A display device 9 is connected to an image output terminal of the image processing board 8. An external device 11 such as an external recording medium is connected to the interface board 10. A CD ROM drive device 12 is connected to the CPU 2, and a CD ROM 13 having recorded therein an image correction program and a program for installing the image correction program is inserted at the CD ROM drive device 12.

The installation program on the CD ROM 13 in the CD ROM drive device 12 opens the image correction program in the CD ROM 13 and stores it in the hard disk 6 in an execution-ready state.

—First Embodiment—

Figure 1:
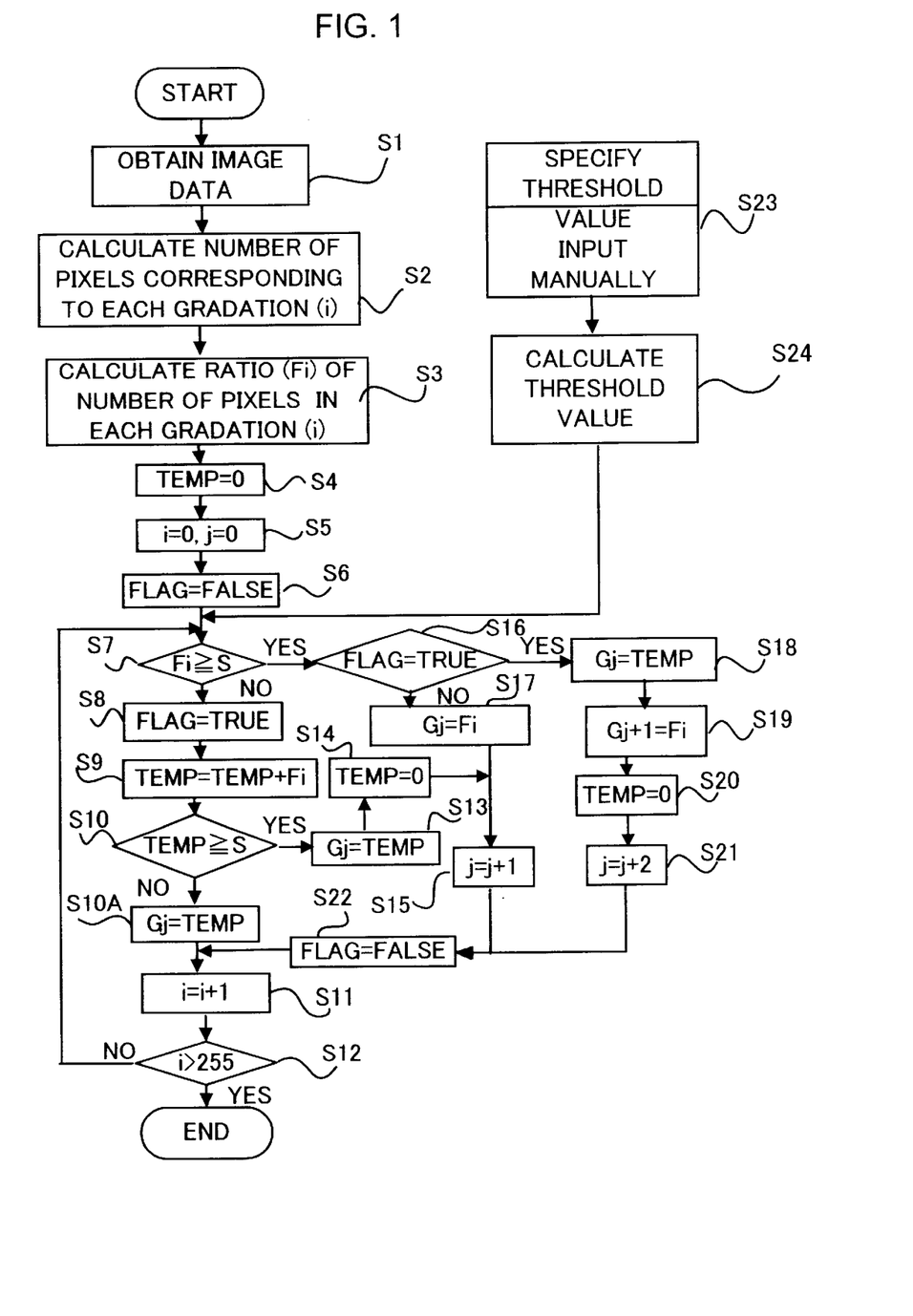
FIG. 1 is a flowchart corresponding to the main operation of a first embodiment of the image correction apparatus according to the present invention.

FIG. 1 is a flowchart of the operation achieved in the first embodiment of the image correction apparatus according to the present invention. The following is an explanation of the image correction operation, given by referring to the step numbers in FIG. 1.

First, as the user activates the image correction program, the CPU 2 opens the image file to undergo correction and obtains image data in step S1 and then the operation proceeds to step S2. In step S2, the number of pixels is calculated in correspondence to each gradation (i) in the image data. In the embodiment, the gradations constitute 8-bit data, with the minimum value at 0 and the maximum value at 255.

Figure 8:
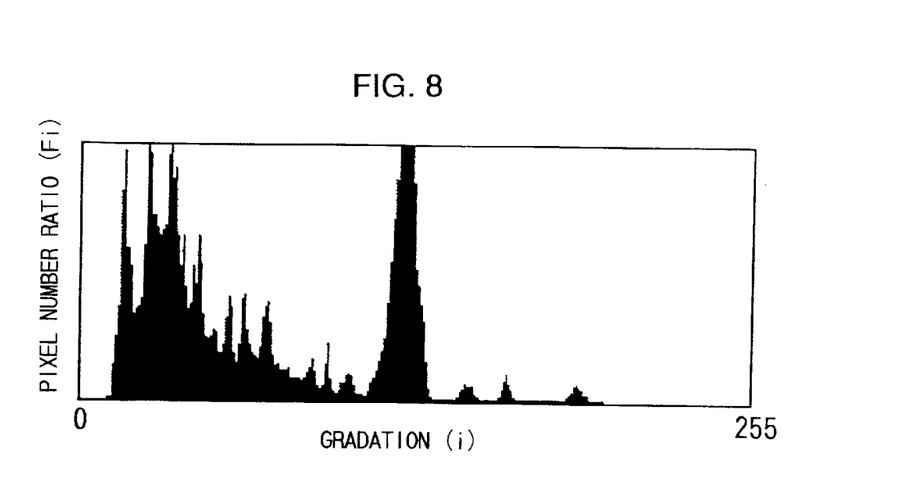
FIG. 8 shows the pre-correction histogram of an image undergoing correction (original image) used in the explanation of the present invention.

In step S3, the ratio (Fi) of the number of pixels corresponding to each gradation (i) against the total number of pixels is calculated. FIG. 8 presents an example of a histogram obtained through this calculation. In FIG. 8, the horizontal axis represents the gradations (i) over 256 levels and the vertical axis represents the pixel number ratio (Fi) The pixel number ratio (Fi) is expressed as follows;

pixel number ratio $(Fi)$=(number of pixels in gradation $I$)/(total number of pixels in image).

In step S4, the variable TEMP in a temporary memory is reset to 0 and then the operation proceeds to step S5. In step 5, gradations i and j are set to; i=0 and j=0. The gradation i represents a gradation in the histogram of the original image, whereas the gradation j represents the gradation in the histogram during the intermediate stage of the correction. In step S6, a flag FLAG is set to its initial value, FALSE.

Then, in step S7, the pixel number ratio Fi is compared against a calculated threshold value S. The threshold value S has been calculated (step S24) based upon the specified threshold value input by the user in advance (step S23). As detailed later, the user may specify whether the threshold value is to be constant for all gradations or is to be variable in correspondence to different gradations. If a constant threshold value is to be used, the value that is input is set as the threshold value. If, on the other hand, a variable threshold value corresponding to individual gradations is to be used, the threshold value S is specified as a function S(i) of the gradation and the threshold value S(i) is calculated in correspondence to the individual gradations.

If the pixel number ratio Fi is determined to be smaller than the threshold value S in step S7, TRUE is set at the flag FLAG in step S8, and then in step S9, the pixel number ratio Fi corresponding to the current gradation i is added to the variable TEMP at the temporary memory. Next, in step S10, the variable TEMP and the threshold value S are compared against each other. When step S10 is executed for the first time, the results of the decision invariably indicate NO.

If a negative decision is made in step S10, the variable TEMP is stored as a variable Gj in step S10A and then the operation proceeds to step S11. In step S11, 1 is added to the gradation i, and in step S12, a decision is made as to whether or not the gradation i is greater than 255. If a negative decision is made in step S12, the operation returns to step S7. If a negative decision is made in step S7, the processing in steps S8, S9, S10, S11 and S12 is repeated.

If an affirmative decision is made in step S10, the value of the variable TEMP is stored as the variable Gj in step S13. In other words, if the pixel number ratios Fi of a plurality of continuous gradations are all less than the threshold value S, the pixel number ratios Fi are integrated in step S9, and when the integrated value becomes equal to or greater than the threshold value S, the integrated value is set as the pixel number ratio of the gradation j to be used for histogram preparation in the intermediate stage during the correction.

When the operation proceeds from step S13 to step S14, the variable TEMP is reset to 0. In step S15, 1 is added to the gradation j. Next, in step S22, the flag FLAG is set to FALSE. Subsequently, the operation returns to step S7 via steps S11 and S12. The operation performed when a negative decision is made in step S7 has been explained earlier. If an affirmative decision is made in step S7, i.e., if the pixel number ratio Fi corresponding to the current gradation i is equal to or greater than the threshold value S, a decision is made in step S16 as to whether or not TRUE is set at the flag FLAG.

In step S16, a decision is made as to whether or not the flag FLAG is set to TRUE. This step is executed to modify the subsequent processing procedure depending upon whether the pixel number ratio Fi corresponding to the preceding gradation has been Less than the threshold value S, or equal to or greater than the threshold value S. Namely, if the pixel number ratio Fi corresponding to the preceding gradation is equal to or greater than the threshold value S, a negative decision is made in step S16. In this case, the pixel number ratio Fi corresponding to the current gradation i is stored as the variable Gj in step S17 and 1 is added to the gradation j in step S15. The subsequent operation performed when a negative decision is made in step S16 after steps S22, S11, S12 and S7 has been explained earlier.

If the pixel number ratio Fi corresponding to the preceding gradation is smaller than the threshold value S, an affirmative decision is made in step S16. In this case, the value of the variable TEMP is stored as the variable Gj in step S18. Next, the operation proceeds to step S19 to store the value of the pixel number ratio Fi as a variable Gj+1. Then, in step S20, the variable TEMP is reset to 0. And then, 2 is added to the gradation j in step S21. The flag FLAG is set to FALSE in step S22. The operation performed when a negative decision is made in step S12 after step S11 has been explained earlier.

In step S12, with respect to the pixel number ratio corresponding to the last gradation to be processed, an affirmative decision is made and the processing ends.

It is to be noted that if the operation proceeds to steps S10A, S11, S12, S7, S16, S18 and S19 before an affirmative decision is made in step S10, a series of gradations with the integrated value of their pixel number ratios Fi not having reached the threshold value S prior to the aforementioned steps is compressed to a single gradation.

Figure 9:
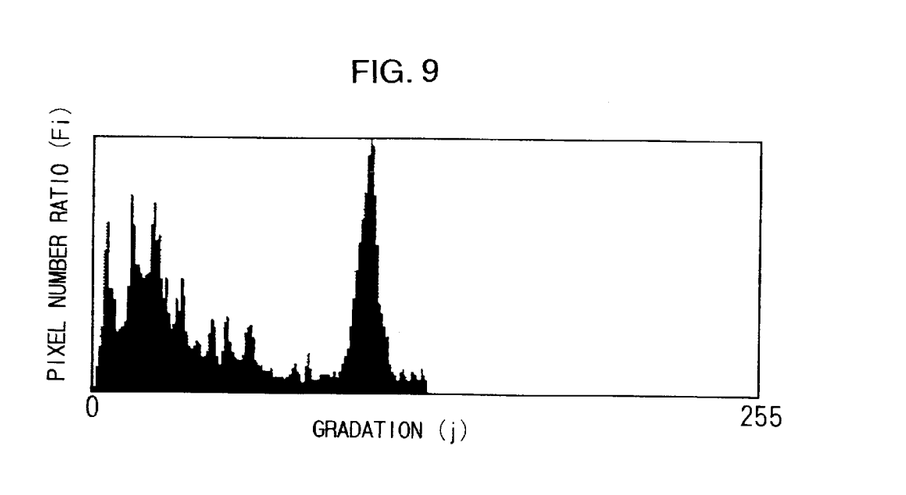
FIG. 9 shows the histogram achieved in the intermediate stage of correction by the image correction apparatus in the first embodiment of the present invention.

FIG. 9 presents the histogram of the image corrected through the operation explained above in reference to the flowchart in FIG. 1. In FIG. 9, the horizontal axis represents the gradations (j) over 256 levels and the vertical axis represents the pixel number ratio (Fi). In other words, the histogram in FIG. 9 is prepared based upon the variable Gj obtained through the operation explained in reference to the flowchart in FIG. 1.

As this histogram indicates, through the processing described above, data corresponding to gradations with the pixel number ratios Fi not exceeding the threshold S are compressed. As a result, the width between the maximum gradation and the minimum gradation is less than 256. Accordingly, the histogram is then expanded to the maximum width of 256. The conversion formula used for this expansion is formula 2 in the known art similar to formula 1.

$$C(x)=n(x-a)/(b-a) \qquad \text{formula 2}$$

In the formula above, x represents a pre-conversion gradation after the correction through the operation in FIG. 1, C(x) represents the converted gradation, a represents the smallest value among the gradations after the correction through the operation in FIG. 1 in the histogram, b represents the largest value among the gradations after the correction through the operation in FIG. 1 in the histogram and n represents the difference between the maximum gradation and the minimum gradation of the converted image which is the maximum value of 8-bit data, i.e., 255 in this example.

As explained above, by employing the method explained in reference to the flowchart, a method of gradation compression that is based upon the relationship between the gradations i and j is achieved. In addition, based upon formula 2 in the known art above, a method of expanding the gradations to the maximum width is achieved.

Figure 10:
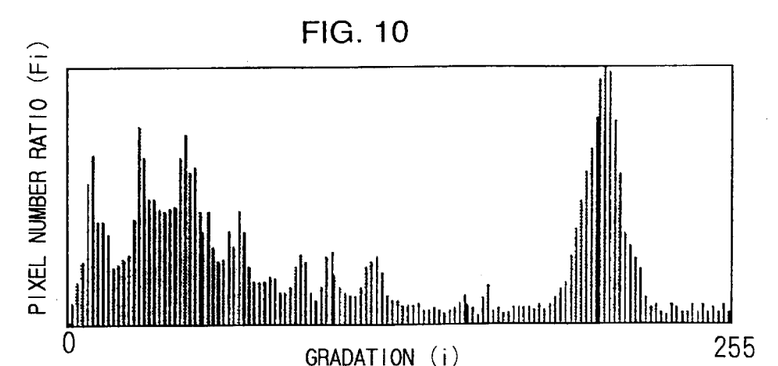
FIG. 10 shows the histogram after the correction by the image correction apparatus in the first embodiment of the present invention.

As a result of the correction processing achieved by combining the compression method and the expansion method implemented on the histogram in FIG. 8, the histogram in FIG. 10, which demonstrates that correction has been achieved by fully using the gradations, is obtained. In FIG. 10, the horizontal axis represents the gradations (i) over 256 levels and the vertical axis indicates the pixel number ratio (Fi). By performing this correction processing achieved by combining the compression method and the expansion method on an original image, image data that are corrected by fully using the gradations are obtained, and these image data are stored in a new file.

For image display, the CPU 2 opens the corrected image data file and displays the image data, at the display device 9 via the image processing board 8. It is to be noted that the pre-correction image and the corrected image may be displayed side-by-side at the display device 9.

While an explanation is given above on the first embodiment of the present invention, it is also desirable to compress the width representing the range over which gradations with pixel number ratios lower than the threshold value are present continuously at a compression rate which is in inverse proportion to the integrated value of the pixel number ratios over that width. In other words, a method in which the width representing the range of the gradations having pixel number ratios smaller than the threshold value is simply ascertained, and the entirety of the width is compressed at a compression rate which is in inverse proportion to the integrated value of the pixel number ratios over the width may be adopted.

The gradation data at the upper end and the lower end of the histogram of a pre-correction image are completely lost during image correction in the correction processing in the prior art. However, the gradation data of the pre-correction image with values less than the threshold value are saved in proportion to the levels of the pixel number ratios and, therefore, are not completely lost in the corrected image in the embodiment. As a result, gradation correction is achieved while more faithfully maintaining the characteristics of the original-image.

—Second Embodiment—

Figure 2:
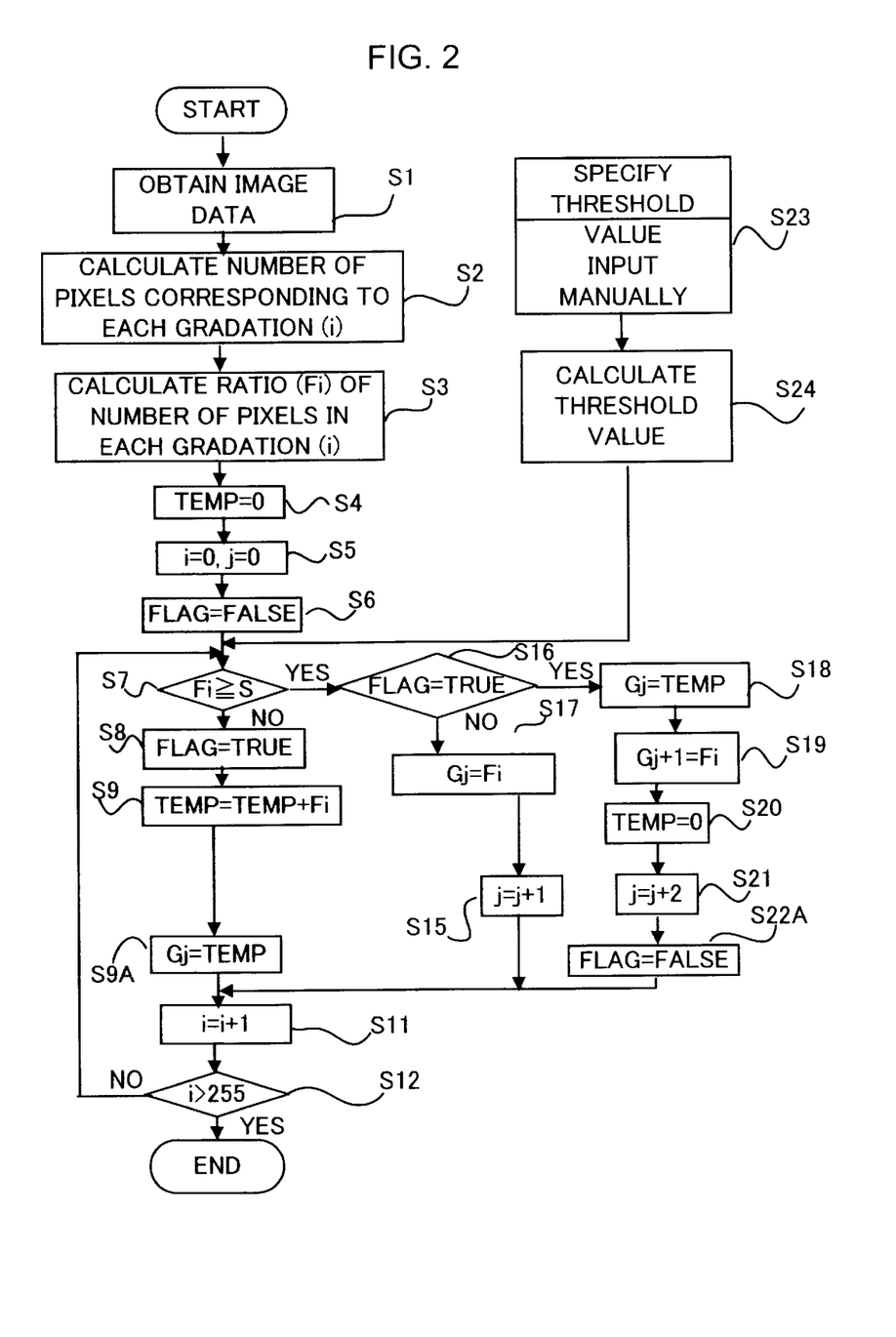
FIG. 2 is a flowchart corresponding to the main operation of a second embodiment of the image correction apparatus according to the present invention.

FIG. 2 is a flowchart of the operation achieved in the second embodiment of the image correction apparatus according to the present invention. The following is an explanation of the image correction operation, given by referring to the step numbers in FIG. 2. The same reference numbers are assigned to steps in FIG. 2 that are similar to those in FIG. 1. The operation in the second embodiment is explained in its entirety including the part that has already been explained in reference to FIG. 1.

First, as the user activates the image correction program, the CPU 2 opens the image file to undergo correction and obtains image data in step S1, and the operation proceeds to step S2. In step S2, the number of pixels is calculated in correspondence to each gradation (i) in the image data. In the embodiment, the gradations constitute 8-bit data, with the minimum value at 0 and the maximum value at 255.

In step S3, the ratio (Fi) of the number of pixels corresponding to each gradation (i) is calculated. FIG. 8 presents an example of a histogram obtained through this calculation. Next, in step S4, the variable TEMP in the temporary memory is reset to 0 and the operation proceeds to step S5. In steps S5, the gradations i and j are set to i=0 and j=0, and then the operation proceeds to step S6 to set the flag FLAG to FALSE. Subsequently, in step S7, the pixel number ratio Fi is compared against the calculated threshold value S. The threshold value S has been calculated (step S24) based upon the specified threshold value input by the user in advance (step S23).

If the pixel number ratio Fi is determined to be smaller than the threshold value S in step S7, TRUE is set at the flag FLAG in step S8. In step S9, the pixel number ratio Fi is added to the variable TEMP at the temporary memory. Next, in step S9A, the variable Gj is substituted in the variable TEMP and the operation proceeds to step S11. In step S11, 1 is added to the gradation i, and in step S12, a decision is made as to whether or not the gradation i is greater than 255. If a negative decision is made in step S12, the operation returns to step S7.

If an affirmative decision is made in step S7, i.e., if the pixel number ratio Fi is equal to or greater than the threshold value S, a decision is made in step S16 as to whether or not TRUE is set at the flag FLAG. If a negative decision is made in step S16, i.e., if it is decided that FALSE is set at the flag FLAG, the value of the pixel number ratio Fi is stored as the variable Gj in step S17, and 1 is added to the gradation j in step S15. The subsequent operation performed when a negative decision is made in step S16 after steps S11, S12 and S7 has been explained earlier.

If an affirmative decision is made in step S16, i.e., if TRUE is set at the flag FLAG, the value of the variable TEMP is stored as the variable Gj in step S18. Next, the operation proceeds to step S19 to store the value of the pixel number ratio Fi as the variable Gj+1. Then, in step S20, the variable TEMP is reset to 0. And then, 2 is added to the gradation j in step S21. In step S22A, the flag FLAG is set to FALSE. The operation performed when a negative decision is made in step S12 via step S11 has been explained earlier.

An affirmative decision is made in step S12 with respect to the last data and the processing ends.

Figure 11:
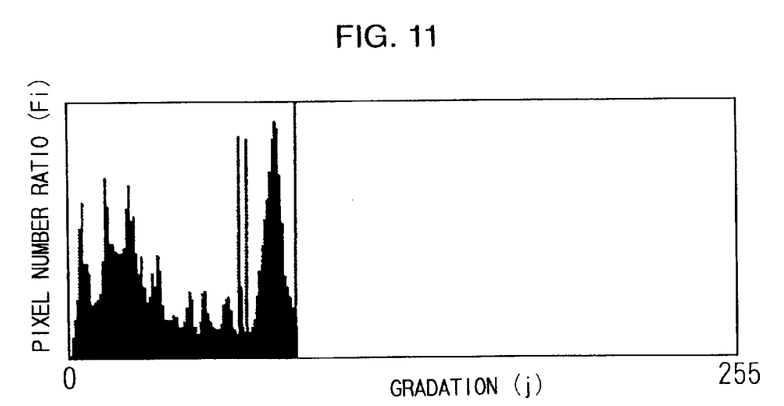
FIG. 11 shows the histogram achieved in the intermediate stage of correction by the image correction apparatus in the second embodiment of the present invention.

FIG. 11 presents the histogram of the image after correction through the operation explained above in reference to the flowchart in FIG. 2. In FIG. 11, the horizontal axis represents the gradations (j) over 256 levels and the vertical axis represents the pixel number ratio (Fi). Since the data corresponding to gradations with pixel number ratios smaller than the threshold value S are compressed in this histogram, as in the first embodiment, the width ranging between the maximum gradation and the minimum gradation is less than 256. For this reason, the histogram is expanded to achieve the maximum width of 256. The conversion formula used for the expansion is formula 2.

Figure 12:
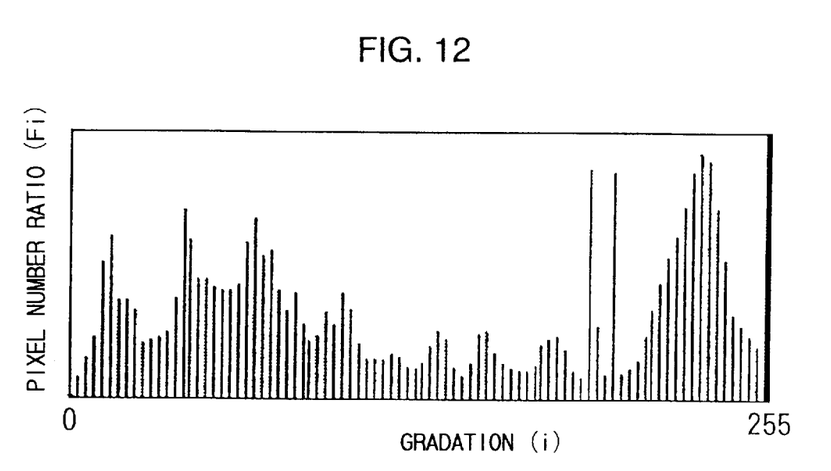
FIG. 12 shows the histogram after the correction by the image correction apparatus in the second embodiment of the present invention.

As a result of the correction processing achieved by combining the compression method and the expansion method implemented on the histogram in FIG. 8, the histogram in FIG. 12, which demonstrates that correction has been achieved by fully using the gradations, is obtained. By performing this correction processing achieved by combining the compression method and the expansion method on an original image, image data that are corrected by fully using the gradations are obtained, and these image data are stored in a new file.

For image display, the CPU 2 opens the corrected image data file and displays the image data at the display device 9 via the image processing board 8. The pre-correction image and the corrected image may be displayed side-by-side at the display device 9.

While the image correction in the second embodiment differs from the image correction achieved in the first embodiment in that the entire width of the gradations up to the gradation with its pixel number ratio exceeding the threshold value is compressed to the minimum gradation width of 1, the second embodiment is characterized in that gradations are utilized more effectively for pixels with pixel number ratios higher than the threshold value.

In the first and second embodiments, a constant value may be specified as the pixel number ratio threshold value or the pixel number ratio threshold value may be specified as a function that is dependent upon the gradation (i) as explained earlier. When a constant value is specified as the threshold value, the user is enabled to vary the extent of image correction easily by simply changing the constant value. As the threshold value is set higher, the extent to which the image is corrected increases. When the threshold value is specified as a function, it is desirable to select a form of the function that will set low threshold value for the low lightness range and high threshold value for the high lightness range. This is because an image with a low lightness level (low gradation) shows even slight changes in gradation more conspicuously compared to an image with a high lightness level (high gradation).

In the first and second embodiments, the threshold value specification (step S23) may be manually entered by the user for each processing cycle, or it may be set in advance to be called up automatically.

The present invention has been explained above in reference to the first and second embodiments. While the histogram is first compressed and then is expanded to achieve the width of 256 gradations according to the above description, the correction processing according to the present invention does not have to be implemented in this order. Compression and expansion may be implemented at the same time, or the histogram may be first expanded and then compressed.

As explained above, according to the present invention, in which a threshold value is specified by the ratio of the number of pixels corresponding to a given gradation against the total number of pixels and an image is corrected based upon a comparison of the threshold value and the ratio at each gradation, an image whose quality has degraded as well as an image that has been photographed under poor or unusual conditions can be corrected in a desirable manner.

What is claimed is:

1. An image correction apparatus, comprising:
   an image intake unit that obtains image data from outside;
   a histogram preparation unit that prepares a histogram by calculating a pixel number ratio at each gradation against the total number of pixels based upon the image data; and
   a gradation correction unit that corrects a gradation width in said histogram based upon a comparison of a threshold value for said pixel number ratio at a gradation and the pixel number ratio at each gradation in said histogram, said threshold value being determined through user specification, wherein:
      said gradation correction unit compresses a width corresponding to a range of gradations having pixel number ratios smaller than said threshold value in said histogram at a compression rate that is in inverse proportion to said pixel number ratio.

2. An image correction apparatus, comprising:
   an image intake unit that obtains image data from outside;
   a histogram preparation unit that prepares a histogram by calculating a pixel number ratio at each gradation against the total number of pixels based upon the image data; and
   a gradation correction unit that corrects a gradation width in said histogram based upon a comparison of a threshold value for said pixel number ratio at a gradation and the pixel number ratio at each gradation in said histogram, said threshold value being determined through user specification, wherein:
      said gradation correction unit compresses a width corresponding to a range of gradations having pixel number ratios smaller than said threshold value in said histogram to a minimum gradation width of 1.

3. An image correction apparatus, comprising:
   an image intake unit that obtains image data from outside;
   a histogram preparation unit that prepares a histogram by calculating a pixel number ratio at each gradation against the total number of pixels based upon the image data; and
   a gradation correction unit that corrects a gradation width in said histogram based upon a comparison of a threshold value for said pixel number ratio at a gradation and the pixel number ratio at each gradation in said histogram, said threshold value being determined through user specification and being expressed as a function ($S(i)$) of a gradation ($i$), wherein:
      said threshold value ($S(i)$) and the pixel number ratio are compared for each gradation in said histogram.

4. A recording medium that stores an image correction program and can be read, said image correction program comprising:
   an image intake procedure in which image data are obtained from outside;
   a histogram preparation procedure in which a histogram is prepared by calculating a pixel number ratio of each gradation against a total number of pixels based upon said image data; and
   a gradation correction procedure in which a histogram gradation width is corrected based upon comparison of a threshold value for said pixel number ratio at a gradation and said pixel number ratio corresponding to each gradation in said histogram, said threshold value being determined through user specification, wherein:
      in said gradation correction procedure, a width corresponding to a range of gradations with pixel number ratios smaller than said threshold value in said histogram is compressed at compression ratio that is in inverse proportion to said pixel number ratio.

5. A recording medium that stores an image correction program and can be read, said image correction program comprising:
   an image intake procedure in which image data are obtained from outside;
   a histogram preparation procedure in which a histogram is prepared by calculating a pixel number ratio of each gradation against a total number of pixels based upon said image data; and
   a gradation correction procedure in which a histogram gradation width is corrected based upon comparison of a threshold value for said pixel number ratio at a gradation and said pixel number ratio corresponding to each gradation in said histogram, said threshold value being determined through user specification, wherein:
      in said gradation correction procedure, said width corresponding to a range of gradations having the pixel number ratios smaller than said threshold value is compressed to a minimum gradation width of 1.

6. A recording medium that stores an image correction program and can be read, said image correction program comprising:
   an image intake procedure in which image data are obtained from outside;
   a histogram preparation procedure in which a histogram is prepared by calculating a pixel number ratio of each gradation against a total number of pixels based upon said image data; and
   a gradation correction procedure in which a histogram gradation width is corrected based upon comparison of a threshold value for said pixel number ratio at a gradation and said pixel number ratio corresponding to each gradation in said histogram, said threshold value being determined through user specification, wherein:
      said threshold value is expressed as a function ($S(i)$) of a gradation ($i$) and the threshold value $S(i)$ and the pixel number ratio are compared for each gradation in said histogram.

* * * * *